United States Patent
Dan et al.

(10) Patent No.: US 11,820,426 B2
(45) Date of Patent: Nov. 21, 2023

(54) METHODS AND SYSTEMS TO CONTROL VEHICLE STEERING

(71) Applicant: GM GLOBAL TECHNOLOGY OPERATIONS LLC, Detroit, MI (US)

(72) Inventors: Alexander J. Dan, Ann Arbor, MI (US); Brian N. Siskoy, Royal Oak, MI (US); Adam J. Kloess, Walled Lake, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 256 days.

(21) Appl. No.: 17/084,113

(22) Filed: Oct. 29, 2020

(65) Prior Publication Data

US 2022/0135128 A1 May 5, 2022

(51) Int. Cl.
*B62D 15/02* (2006.01)
*B60W 30/10* (2006.01)

(52) U.S. Cl.
CPC ........... *B62D 15/025* (2013.01); *B60W 30/10* (2013.01)

(58) Field of Classification Search
CPC ...... B60W 30/10; B65D 15/025; B65D 1/286
See application file for complete search history.

(56) References Cited

U.S. PATENT DOCUMENTS

| | | | |
|---|---|---|---|
| 2019/0061769 A1* | 2/2019 | Panse | B62D 15/025 |
| 2020/0070888 A1* | 3/2020 | Millsap | B62D 15/029 |
| 2021/0191403 A1* | 6/2021 | Rastoll | G05D 1/0022 |
| 2021/0394828 A1* | 12/2021 | Audino | B62D 15/025 |

* cited by examiner

*Primary Examiner* — Jeff A Burke
*Assistant Examiner* — Zachary Joseph Wallace
(74) *Attorney, Agent, or Firm* — Quinn IP Law (57) ABSTRACT

A method of controlling a vehicle includes determining a first projected path of the vehicle, receiving sensor data corresponding to a steering input, determining a first blended vehicle path resulting from a first blended steering command based on the first projected path and the sensor data, and determining when the first blended vehicle path satisfies a first criteria. When the controller determines that the first blended vehicle path satisfies the first criteria, the controller relinquishes control of the vehicle to an operator and when the controller determines that the first blended vehicle path does not satisfy the first criteria, the controller generates a second blended vehicle path resulting from a second blended steering command based on the first projected path and the sensor data.

20 Claims, 3 Drawing Sheets

METHODS AND SYSTEMS TO CONTROL VEHICLE STEERING

INTRODUCTION

The present disclosure relates to vehicles controlled by automated driving systems, particularly those configured to automatically control vehicle steering, acceleration, and braking during a drive cycle without human intervention and to the transfer of steering control from the automated driving system to an operator.

The operation of modern vehicles is becoming more automated, i.e., able to provide driving control with less and less driver intervention. Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

SUMMARY

Embodiments according to the present disclosure provide a number of advantages. For example, embodiments according to the present disclosure enable transition of control of the vehicle steering from an automated driving system to the operator when the driver is fully engaged and controlling the vehicle along a path free of obstacles, for example and without limitation. The methods and systems described herein reject steering inputs determined to be undesirable and blend the operator-inputted steering command with the steering command determined by the automated driving system to transfer steering control gradually and smoothly to the operator.

In one aspect of the present disclosure, a method of controlling a vehicle includes determining, by a controller, a first projected path of the vehicle, receiving sensor data from at least one vehicle sensor, the sensor data corresponding to a steering input, determining a first blended vehicle path resulting from a first blended steering command based on the first projected path and the sensor data corresponding to the steering input, determining an instantaneous position of the vehicle using an automated driving system control algorithm of the controller, comparing the first projected path with the instantaneous position of the vehicle, and determining when the first blended vehicle path satisfies a first criteria. When the controller determines that the first blended vehicle path satisfies the first criteria, the method includes relinquishing control of the vehicle from the automated driving system to an operator. When the controller determines that the first blended vehicle path does not satisfy the first criteria, the method includes generating a second blended vehicle path resulting from a second blended steering command based on the first projected path and the sensor data corresponding to the steering input.

In some aspects, the steering input is an operator-inputted steering command.

In some aspects, the first criteria is satisfied when the steering input is within a predetermined lateral steering deviation from the first projected path.

In some aspects, the method further includes selectively rejecting steering input that does not satisfy the first criteria.

In some aspects, the method further includes selectively accepting an acceptable portion of the sensor data corresponding to the steering input that satisfies the first criteria.

In some aspects, the method further includes determining a confidence interval defining an engagement level of the operator. The engagement level of the operator is determined by comparing an operator-input steering wheel angle with an automated driving system steering wheel angle.

In some aspects, the method further includes relinquishing control of the vehicle from the automated driving system to the operator when the confidence interval reaches a predetermined threshold.

In some aspects, the at least one vehicle sensor includes a torque sensor configured to determine an operator-input steering torque and a steering wheel angle sensor configured to determine a steering wheel angle. The steering input includes the operator-input steering torque and the steering wheel angle.

In some aspects, determining the confidence interval includes comparing the steering wheel angle with the first projected path of the vehicle.

In some aspects, the method further includes gradually relinquishing steering control of the vehicle to the operator during a predetermined time interval.

In another aspect of the present disclosure, an automotive vehicle includes a body, a steering system coupled to the body and including at least one sensor, and an actuator operably coupled to the steering system. The actuator is configured to automatically control the steering system. The automotive vehicle also includes at least one controller in communication with the at least one sensor and the actuator. The at least one controller includes an automated driving system and is configured to determine a first projected path of the vehicle, receive sensor data corresponding to a steering input, determine a second projected path of the vehicle based on a blend of the sensor data corresponding to the steering input and the first projected path, compare the first projected path with the second projected path and determine when the second projected path satisfies a first criteria. When the controller determines that the second projected path satisfies the first criteria, the controller relinquishes control of the vehicle from the automated driving system to an operator and when the controller determines that the second projected path does not satisfy the first criteria, the controller rejects the steering input and automatically controls the vehicle to follow the first projected path.

In some aspects, the steering input is an operator-inputted steering command.

In some aspects, the first criteria is satisfied when the steering input is within a predetermined lateral steering deviation from the first projected path.

In some aspects, the controller is further configured to selectively reject steering input that does not satisfy the first criteria and selectively accept an acceptable portion of the sensor data corresponding to the steering input that satisfies the first criteria.

In some aspects, the controller is further configured to gradually relinquish steering control of the vehicle to the operator during a predetermined time interval.

In some aspects, the at least one sensor includes a torque sensor configured to determine an operator-input steering wheel torque and a steering wheel angle sensor configured to determine a steering wheel angle.

In another aspect of the present disclosure, a system for controlling an automotive vehicle includes a steering system coupled to the body and including at least one sensor and an actuator operably coupled to the steering system. The actuator is configured to automatically control the steering system. The system also includes at least one controller in communication with the at least one sensor and the actuator. The at least one controller has an automated driving control algorithm and is configured to determine a first projected path of the vehicle, receive sensor data corresponding to a steering input, determine a first blended vehicle path including a first blended steering command based on the first projected path and the sensor data corresponding to the steering input, compare the first projected path with a current lane position of the vehicle as determined by the automated driving control algorithm, and determine when the first blended vehicle path satisfies a first criteria. When the controller determines that the first blended vehicle path satisfies the first criteria, the controller relinquishes control of the vehicle from the automated driving system to an operator and when the controller determines that the first blended vehicle path does not satisfy the first criteria, the controller generates a second blended vehicle path resulting from a second blended steering command based on the first projected path and the sensor data corresponding to the steering input.

In some aspects, the steering input is an operator-inputted steering command and the second projected path of the vehicle is a projected path of the vehicle based on the operator-inputted steering command and the first criteria is satisfied when the steering input is within a predetermined lateral steering deviation from the first projected path.

In some aspects, the controller is further configured to determine a confidence interval defining an engagement level of the operator. Determining the confidence interval includes comparing a steering wheel angle measured by the sensor with a steering angle associated with the first projected path of the vehicle.

In some aspects, the controller is further configured to selectively reject steering input that does not satisfy the first criteria, selectively accept an acceptable portion of the sensor data corresponding to the steering input that satisfies the first criteria, and gradually relinquish steering control of the vehicle to the operator during a predetermined time interval.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above, derivatives thereof, and words of similar import.

Figure 1:
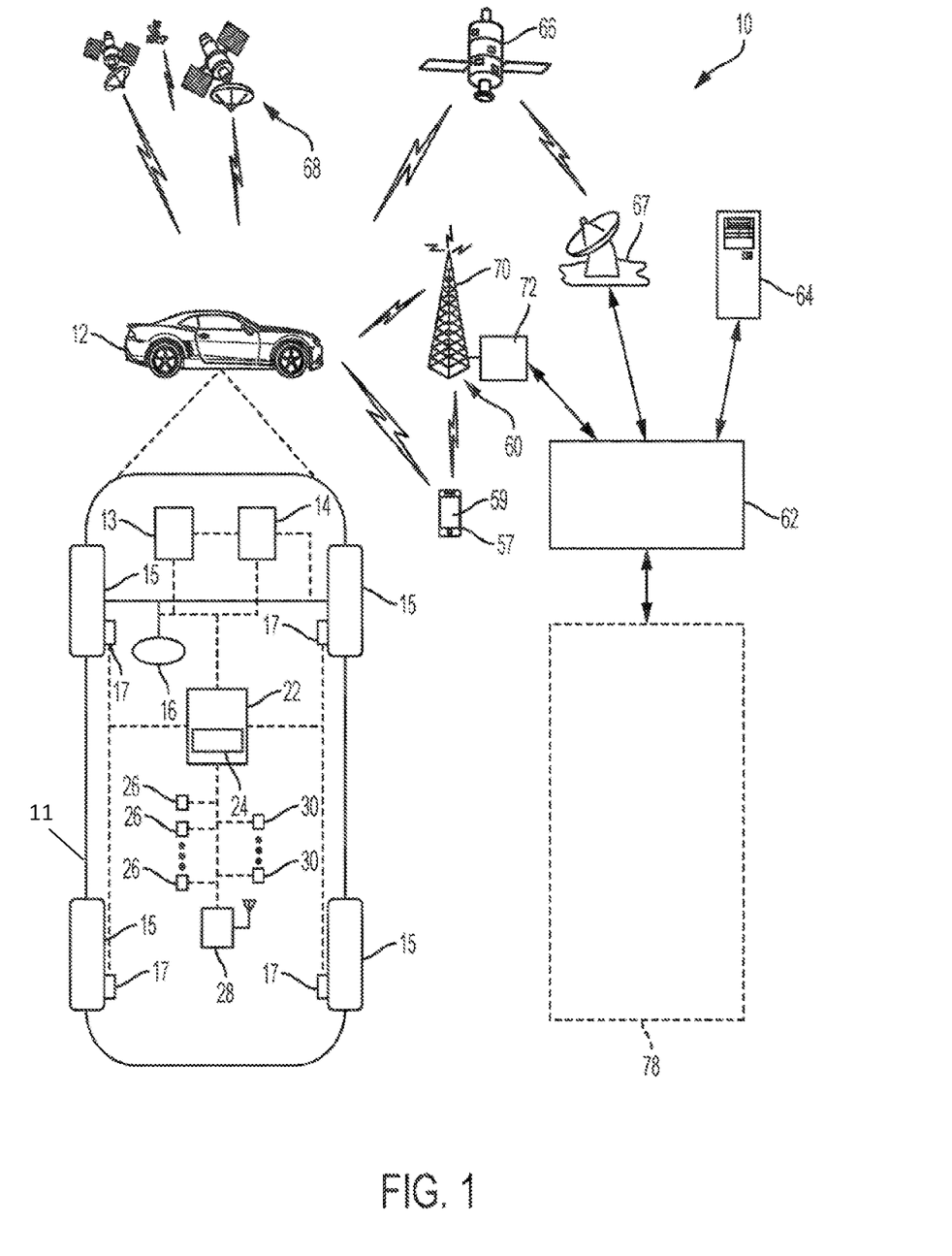
FIG. 1 is a schematic diagram of a communication system including an autonomously controlled vehicle, according to an embodiment of the present disclosure.

FIG. 1 schematically illustrates an operating environment that includes a mobile vehicle communication and control system 10 for a motor vehicle 12. The communication and control system 10 for the vehicle 12 generally includes one or more wireless carrier systems 60, a land communications network 62, a computer 64, a mobile device 57 such as a smart phone, and a remote access center 78.

The vehicle 12, shown schematically in FIG. 1, having a body 11, is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. The vehicle 12 includes a propulsion system 13, a transmission 14, a plurality of vehicle wheels 15, and a steering system 16, all coupled to the body 11. The propulsion system 13 may in various embodiments include an internal combustion engine, an electric machine such as a traction motor, and/or a fuel cell propulsion system.

The vehicle 12 also includes the transmission 14 configured to transmit power from the propulsion system 13 to the plurality of vehicle wheels 15 according to selectable speed ratios. According to various embodiments, the transmission 14 may include a step-ratio automatic transmission, a continuously-variable transmission, or other appropriate transmission.

The vehicle 12 additionally includes wheel brakes 17 configured to provide braking torque to the vehicle wheels 15. The wheel brakes 17 may, in various embodiments, include friction brakes, a regenerative braking system such as an electric machine, and/or other appropriate braking systems.

The vehicle 12 additionally includes the steering system 16. While depicted as including a steering wheel for illustrative purposes, in some embodiments contemplated within the scope of the present disclosure, the steering system 16 may not include a steering wheel. In various embodiments, the steering system 16 is a steer-by-wire steering system. In other embodiments, the steering system 16 is a rack and pinion steering system. In various embodiments, the steering system 16 includes at least one sensor, such as one of the sensors 26.

The vehicle 12 includes a wireless communications system 28 configured to wirelessly communicate with other vehicles ("V2V") and/or infrastructure ("V2I"). In an exemplary embodiment, the wireless communication system 28 is configured to communicate via a dedicated short-range communications (DSRC) channel. DSRC channels refer to one-way or two-way short-range to medium-range wireless communication channels specifically designed for automotive use and a corresponding set of protocols and standards. However, wireless communications systems configured to communicate via additional or alternate wireless communications standards, such as IEEE 802.11 and cellular data communication, are also considered within the scope of the present disclosure.

The propulsion system 13, transmission 14, steering system 16, and wheel brakes 17 are in communication with or under the control of at least one controller 22. While depicted as a single unit for illustrative purposes, the controller 22 may additionally include one or more other controllers, collectively referred to as a "controller." The controller 22 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The controller 22 includes an automated driving system (ADS) 24 for automatically controlling various actuators in the vehicle. In an exemplary embodiment, the ADS 24 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 24 is configured to control the propulsion system 13, transmission 14, steering system 16, and wheel brakes 17 to control vehicle acceleration, steering, and braking, respectively, without human intervention via a plurality of actuators 30 in response to inputs from a plurality of sensors 26, which may include GPS, RADAR, LIDAR, optical cameras, thermal cameras, ultrasonic sensors, and/or additional sensors as appropriate.

FIG. 1 illustrates several networked devices that can communicate with the wireless communication system 28 of the vehicle 12. One of the networked devices that can communicate with the vehicle 12 via the wireless communication system 28 is the mobile device 57. The mobile device 57 can include computer processing capability, a transceiver capable of communicating using a short-range wireless protocol, and a visual smart phone display 59. The computer processing capability includes a microprocessor in the form of a programmable device that includes one or more instructions stored in an internal memory structure and applied to receive binary input to create binary output. In some embodiments, the mobile device 57 includes a GPS module capable of receiving GPS satellite signals and generating GPS coordinates based on those signals. In other embodiments, the mobile device 57 includes cellular communications functionality such that the mobile device 57 carries out voice and/or data communications over the wireless carrier system 60 using one or more cellular communications protocols, as are discussed herein. The visual smart phone display 59 may also include a touch-screen graphical user interface.

The wireless carrier system 60 is preferably a cellular telephone system that includes a plurality of cell towers 70 (only one shown), one or more mobile switching centers (MSCs) 72, as well as any other networking components required to connect the wireless carrier system 60 with the land communications network 62. Each cell tower 70 includes sending and receiving antennas and a base station, with the base stations from different cell towers being connected to the MSC 72 either directly or via intermediary equipment such as a base station controller. The wireless carrier system 60 can implement any suitable communications technology, including for example, analog technologies such as AMPS, or digital technologies such as CDMA (e.g., CDMA2000) or GSM/GPRS. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from using the wireless carrier system 60, a second wireless carrier system in the form of satellite communication can be used to provide uni-directional or bi-directional communication with the vehicle 12. This can be done using one or more communication satellites 66 and an uplink transmitting station 67. Uni-directional communication can include, for example, satellite radio services, wherein programming content (news, music, etc.) is received by the transmitting station 67, packaged for upload, and then sent to the satellite 66, which broadcasts the programming to subscribers. Bi-directional communication can include, for example, satellite telephony services using the satellite 66 to relay telephone communications between the vehicle 12 and the station 67. The satellite telephony can be utilized either in addition to or in lieu of the wireless carrier system 60.

The land network 62 may be a conventional land-based telecommunications network connected to one or more landline telephones and connects the wireless carrier system 60 to the remote access center 78. For example, the land network 62 may include a public switched telephone network (PSTN) such as that used to provide hardwired telephony, packet-switched data communications, and the Internet infrastructure. One or more segments of the land network 62 could be implemented through the use of a standard wired network, a fiber or other optical network, a cable network, power lines, other wireless networks such as wireless local area networks (WLANs), or networks providing broadband wireless access (BWA), or any combination thereof. Furthermore, the remote access center 78 need not be connected via land network 62 but could include wireless telephony equipment so that it can communicate directly with a wireless network, such as the wireless carrier system 60.

While shown in FIG. 1 as a single device, the computer 64 may include a number of computers accessible via a private or public network such as the Internet. Each computer 64 can be used for one or more purposes. In an exemplary embodiment, the computer 64 may be configured as a web server accessible by the vehicle 12 via the wireless communication system 28 and the wireless carrier 60. Other computers 64 can include, for example: a service center computer where diagnostic information and other vehicle data can be uploaded from the vehicle via the wireless communication system 28 or a third party repository to or from which vehicle data or other information is provided, whether by communicating with the vehicle 12, the remote access center 78, the mobile device 57, or some combination of these. The computer 64 can maintain a searchable database and database management system that permits entry, removal, and modification of data as well as the receipt of requests to locate data within the database. The computer 64 can also be used for providing Internet connectivity such as DNS services or as a network address server that uses DHCP or other suitable protocol to assign an IP address to the vehicle 12. The computer 64 may be in communication with at least one supplemental vehicle in addition to the vehicle 12. The vehicle 12 and any supplemental vehicles may be collectively referred to as a fleet.

Figure 2:
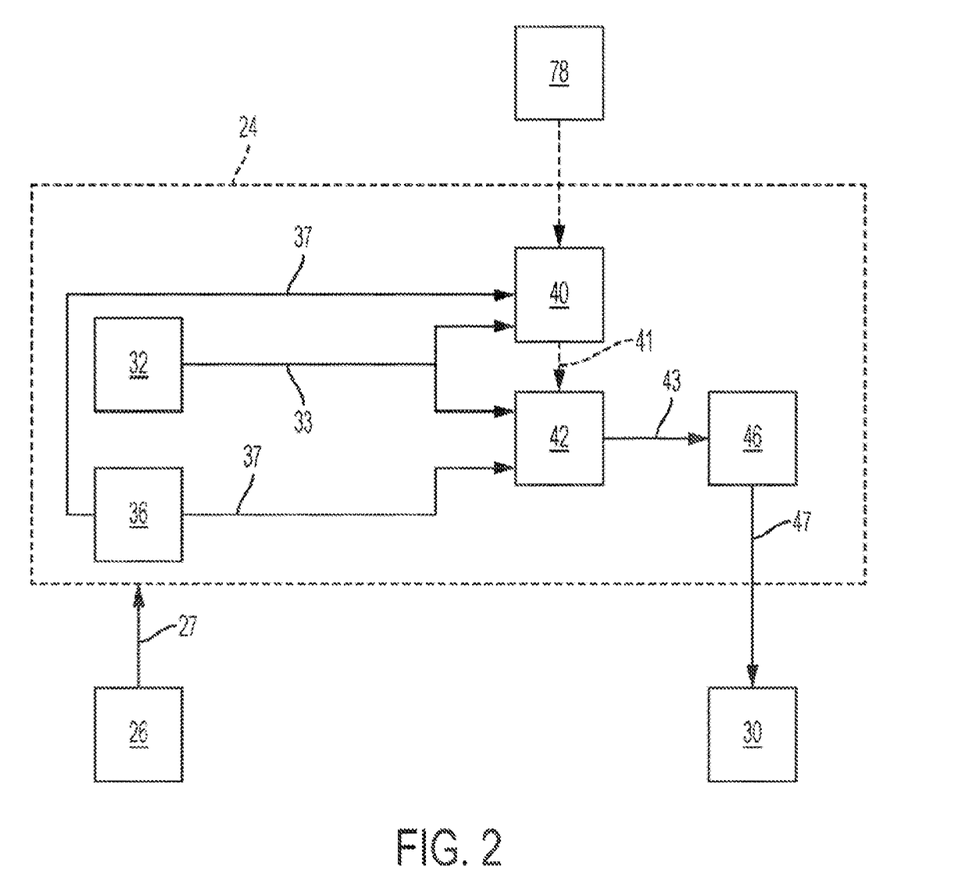
FIG. 2 is a schematic block diagram of an automated driving system (ADS) for a vehicle, according to an embodiment of the present disclosure.

As shown in FIG. 2, the ADS 24 includes multiple distinct control systems, including a sensor fusion and preprocessing module 32 that processes and synthesizes sensor data 27 from the variety of sensors 26. The sensor fusion and preprocessing module 32 performs calibration of the sensor data 27, including, but not limited to, LIDAR to LIDAR calibration, camera to LIDAR calibration, LIDAR to chassis calibration, and LIDAR beam intensity calibration. The sensor fusion and preprocessing module 32 outputs preprocessed sensor output 33. The sensor output 33 includes various calculated parameters including, but not limited to, a location of a detected obstacle relative to the vehicle, a predicted path of the detected obstacle relative to the vehicle, and a location and orientation of traffic lanes relative to the vehicle.

The ADS 24 also includes a mapping and localization module 36 for determining the location of the vehicle and route for a current drive cycle. The mapping and localization module 36 is also configured to receive inputs from a variety of sensors, such as the sensors 26 illustrated in FIG. 1. The mapping and localization module 36 processes and synthesizes the inputs from the variety of sensors and generates a mapping and localization output 37. The mapping and localization output 37 includes various calculated parameters including, but not limited to, a vehicle route for the current drive cycle and a current vehicle location relative to the route.

The ADS 24 also includes an observation and interpretation module 40. The observation and interpretation module 40 allows access to the vehicle by the remote access center 78. A live expert or advisor can optionally review the preprocessed sensor output 33 and the mapping and localization output 37. The live advisor can provide additional input and/or override automatic driving operations and assume operation of the vehicle if desired or required by a vehicle situation. The observation and interpretation module 40 generates an interpreted output 41 that includes additional input provided by the live expert, if any.

The ADS 24 additionally includes a path planning module 42 for determining a vehicle path to be followed to maintain the vehicle on the desired route while obeying traffic laws and avoiding any detected obstacles. The path planning module 42 employs a first obstacle avoidance algorithm configured to track and avoid any detected obstacles in the vicinity of the vehicle, a first lane keeping algorithm configured to maintain the vehicle in a current traffic lane, and a first route keeping algorithm configured to maintain the vehicle on the desired route. The path planning module 42 is configured to receiving the sensor output 33, the mapping and localization output 37, and the interpreted output 41 (if any). The path planning module 42 processes and synthesizes the sensor output 33, the mapping and localization output 37, and the interpreted output 41 (if any) and generates a path planning output 43 that includes a commanded vehicle path based on the vehicle route, vehicle location relative to the route, location and orientation of traffic lanes, and the presence and path of any detected obstacles.

The ADS 24 further includes a vehicle control module 46 for issuing control commands to vehicle actuators 30. The vehicle control module 46 employs a first path algorithm for calculating a vehicle path. The vehicle control module 46 is configured to receive the path planning output 43. The vehicle control module 46 processes the path planning output 43 and generates a vehicle control output 47. The vehicle control output 47 includes a set of actuator commands to achieve the commanded path from the vehicle control module 46, including but not limited to a steering command, a shift command, a throttle command, and a brake command.

The vehicle control output 47 is communicated to actuators 30. In an exemplary embodiment, the actuators 30 include a steering control, a shifter control, a throttle control, and a brake control. The steering control may, for example, control a steering system 16 as illustrated in FIG. 1. The shifter control may, for example, control a transmission 14 as illustrated in FIG. 1. The throttle control may, for example, control a propulsion system 13 as illustrated in FIG. 1. The brake control may, for example, control wheel brakes 17 as illustrated in FIG. 1.

It should be understood that the disclosed methods can be used with any number of different systems and is not specifically limited to the operating environment shown here. The architecture, construction, setup, and operation of the system 10 and its individual components is generally known. Other systems not shown here could employ the disclosed methods as well.

In the illustrated embodiment, the vehicle 12 is a so-called dual mode vehicle, capable of being operated by a human driver or by the ADS 24. During automated operation, including, for example, automated steering control by the ADS 24, under various conditions, an operator may take control of the vehicle's steering system, such that the steering system is under operator control. The transition of control of the vehicle steering from the ADS 24 to the operator should occur when the driver is fully engaged and controlling the vehicle along a path free of obstacles, for example and without limitation. The methods and systems described herein will reject steering inputs determined to be undesirable (i.e., steering inputs that would direct the vehicle along a path containing obstacles, for example). In various embodiments, these steering inputs may be accidental inputs from an operator of a steer-by-wire steering system of the vehicle, such as the steering system 16 of the vehicle 12.

The ADS 24, along with the sensor 26 and the actuators 30, control the various systems of the vehicle 12, including the steering system 16, when the vehicle 12 is operating in an autonomous or semi-autonomous mode. In these modes of operation, the ADS 24 determines a first projected path of the vehicle 12, based on sensor input from the plurality of sensors 26, as discussed herein.

In some circumstances, such as, for example and without limitation, when sensor data from the steering system 16 indicates a steering input, such as an operator-inputted steering command, including, for example, a driver override, the ADS 24 processes and analyzes the sensor data to determine how much of the operator-inputted steering command to allow. That is, in some circumstances, the operator-inputted steering command may be unintentional, such as a bump, for example. The ADS 24 evaluates the sensor data and determines how to gradually incorporate the steering input to maintain a vehicle path that avoids obstacles during a transition from autonomous or semi-autonomous steering control to operator-controlled steering control.

In other circumstances, if no torque feedback is available to the operator, such as in the case of an inoperable steering wheel emulator in a steer by wire system, the steering system 16 uses steering angle sensors 26 to determine operator engagement. In this situation, it can become easy for the operator to oversteer the vehicle 12 as there is no torque feedback to the operator.

In these scenarios, the ADS 24 can receive, process, and analyze the sensor data from the steering system 16 to determine a second projected path of the vehicle based on the operator-inputted steering command. The ADS 24 also compares the second projected path of the vehicle with the first projected path to determine whether the second projected path satisfies a first criteria. In various embodiments, the first criteria is satisfied when the steering input is within a predetermined lateral steering deviation from the first projected path.

In various embodiments, the ADS 24 selectively rejects steering input that does not satisfy the first criteria and selectively accepts an acceptable portion of the steering input that satisfies the first criteria. By selectively accepting and rejecting portions of the steering input received from the sensors 26 of the steering system 16, the ADS 24 can iteratively generate blended steering commands and blended vehicle paths that incorporate some or all of the steering input such that the transition from autonomous or semi-autonomous steering to full driver control is more smooth. For example, the ADS 24 can selectively reject steering input that results from the vehicle traveling over a bump while operating in autonomous or semi-autonomous steering control. In various embodiments, when the steering input satisfies the first criteria, the ADS 24 can completely accept the steering input and relinquish steering control of the vehicle 12 to the operator. In various embodiments, the ADS 24 can reject all or some of the steering input and maintain steering control of the vehicle 12. Additionally, in some embodiments, over a predetermined time period during which the steering input is received, the ADS 24 gradually relinquishes steering control of the vehicle to the operator.

In various embodiments, the ADS 24 can determine one or more blended vehicle paths. The blended vehicle path is a vehicle path resulting from the inclusion of a blended steering command based on the projected vehicle path as determined by the ADS 24 and the steering input received from the sensors 26 of the steering system 16. In various embodiments, the ADS 24 determines a first blended vehicle path resulting from a first blended steering command based on the first projected path of the vehicle and the sensor data corresponding to the steering input. When the first blended vehicle path satisfies a first criteria, such as, for example, when the steering input within a predetermined lateral steering deviation from the first projected path, the ADS 24 recognizes a high confidence in the operator-inputted steering command and relinquishes control of the vehicle from the ADS 24 to the operator.

In various scenarios, such as a steering emulator failure in a steer-by-wire steering system or when an emulator steering angle deviates from the commanded angle of the rack pinion, the operator may not receive sufficient steering feedback and may mistakenly input a very high initial steering wheel angle. To counteract this situation, the ADS 24 applies a confidence interval analysis. The ADS 24 performs the confidence interval analysis by comparing the first projected vehicle path with a blended vehicle path resulting from a blended steering command including at least a portion or percentage of the operator's steering input and the steering command of the first projected vehicle path. The confidence interval defines an engagement level of the operator, that is, how close the operator's steering input is to the vehicle's projected heading when the vehicle is under autonomous steering control by the ADS 24. In various embodiments, the confidence interval is determined by examining the steering wheel angle, which represents the operator's steering input, with the steering angle as determined by the ADS 24. In other words, the first projected path of the vehicle as determined by the ADS 24 includes a steering command configured to retain the vehicle 12 within a road lane and away from detected obstacles. The ADS 24 compares the operator's steering input to the steering command of the first projected path to see how closely the two steering commands align.

When the first blended vehicle path does not satisfy the first criteria, the ADS 24 does not recognize a high confidence in the operator-inputted steering command and generates a second blended vehicle path resulting from a second blended steering command based on the steering input and the first projected path. The ADS 24 continues to compare the latest blended vehicle path with the first criteria until a confidence interval in the operator-inputted steering input reaches a predetermined threshold.

In various embodiments, at least one of the sensors 26 is a torque sensor configured to measure an operator-input steering torque as the steering input. In various embodiments, at least one of the sensors 26 is a steering wheel angle sensor configured to measure a steering wheel angle. The ADS 24 receives the sensor data from the torque sensor and/or the steering wheel angle sensor and processes and analyzes the sensor data to determine whether to selectively accept or reject the steering input. As noted herein, in various embodiments, the ADS 24 processes the sensor data to determine if an operator takeover event is present, for example and without limitation, generates a new projected path based on the sensor data, and determines how much weight to give to the sensor data in determining the amount of steering control to relinquish to the operator.

Figure 3:
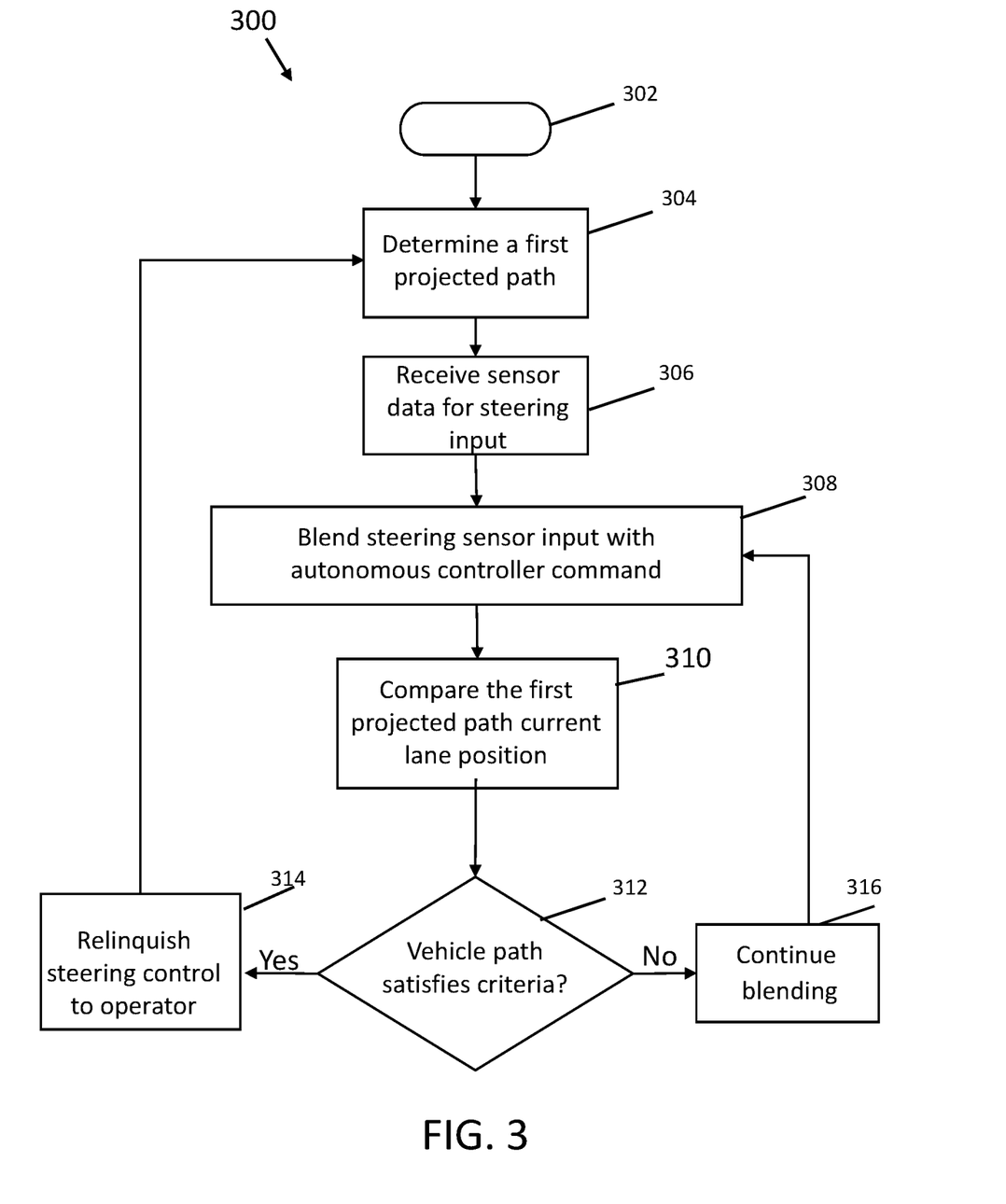
FIG. 3 is a flow chart of a method for controlling vehicle steering, according to an embodiment of the present disclosure.

FIG. 3 illustrates a method 300 to control vehicle steering, according to an embodiment of the present disclosure. The method 300 can be utilized in connection with the ADS 24 of the vehicle 12, as discussed herein. The method 300 can be utilized in connection with the controller 22 as discussed herein, or by other systems associated with or separate from the vehicle, in accordance with exemplary embodiments. The order of operation of the method 300 is not limited to the sequential execution as illustrated in FIG. 3, but may be performed in one or more varying orders, or steps may be performed simultaneously, as applicable in accordance with the present disclosure.

Beginning at 302, the method 300 proceeds to 304. At 304, an automated driving system such as the ADS 24 of the controller 22 determines a first projected path of the vehicle, such as the vehicle 12. As discussed herein, the first projected path of the vehicle 12 is based at least in part on sensor data from the plurality of sensors 26.

Next, at 306, the ADS 24 of the controller 22 receives sensor data corresponding to a steering input. The steering input may be received from a steering torque sensor, steering wheel angle sensor, or any other sensor 26 configured to measure a steering input.

The method proceeds to 308. The ADS 24 of the controller 22 analyzes and processes the sensor data received from at least one of the sensors 26 and determines a blended path of the vehicle 12 based on a blended steering command generated from at least a portion or percentage of the steering input and the steering command of the first projected path generated by the ADS 24. In other words, the ADS 24 blends the steering input received from the sensor data with the autonomous steering command to generate a blended steering command resulting in a blended vehicle path.

The method then proceeds to 310, wherein the ADS 24 compares the first projected path with an instantaneous position of the vehicle. In various embodiments, comparing the first projected path with the instantaneous position of the vehicle includes determining whether the vehicle 12 is currently positioned in a lane or in a position in which the vehicle 12 is less likely to encounter obstacles as compared to the projected path determined by the ADS 24. In various embodiments, the comparison between the first projected path and the instantaneous vehicle position is used by the ADS 24 to selectively accept or reject the sensor data corresponding to the steering input.

Next, at 312, the ADS 24 determines when the first blended vehicle path satisfies a first criteria. In various embodiments, the first criteria is satisfied when the steering input is within a predetermined lateral steering deviation from the first projected path. When the ADS 24 determines that the first blended vehicle path satisfies the first criteria, the method 300 proceeds to 314 and the ADS 24 relinquishes steering control of the vehicle 12 to the operator. In some embodiments, relinquishing steering control to the operator includes gradually relinquishing steering control to the operator over a predetermined time interval. In other words, the ADS 24 gradually accepts more and more of the operator's steering input and provides less direct control of the vehicle steering. As discussed herein, the ADS 24 uses, in some embodiments, a confidence interval to determine the operator's level of engagement with the steering system 16 and thus how much weight to give to the operator's steering input over time. The method 300 then returns to 304 and continues as discussed herein.

When the ADS 24 determines that the first blended vehicle path does not satisfy the first criteria, the method 300 proceeds to 316. At 316, the ADS 24 generates a second blended vehicle path resulting from a second blended steering command based on the first projected path and the sensor data corresponding to the steering input. In some embodiments, the ADS 24 selectively rejects steering input that does not satisfy the first criteria. In various embodiments, the ADS 24 selectively accepts an acceptable portion of the sensor data corresponding to steering input that satisfies the first criteria. From 316, the method 300 returns to 308 and continues as discussed above, with additional blending of the steering input with the autonomous steering command occurring until a confidence interval in the operator's engagement reaches a predetermined threshold.

In various embodiments, the predetermined threshold is reached when the steering command received from the operator and the steering command generated by the ADS 24 match at least 90%. In various embodiments, the predetermined threshold is approximately a 100% match between the steering command received from the operator and the steering command generated by the ADS 24. In other words, as the confidence interval or confidence in the operator's engagement with the steering system increases, the ADS 24 will generate steering commands that bias toward more operator control, that is, the steering commands contain more of the steering input received from the operator, until full steering control is granted to the operator. This method of eventually granting the operator steering control of the vehicle 12 allows for a deliberate transfer of control while any other takeover criteria are being met, and also results in a smooth transfer of steering control from the ADS 24 to the operator.

The systems and methods described herein to selectively accept and reject steering input can be used with any type of steering system 16, such as steer-by-wire steering systems as well as electronic power steering (EPS) systems. A steer-by-wire steering system 16 has the capability of actuating the wheels 15 independent of the steering wheel inputs. Using the methods and systems discussed herein, the ADS 24 can determine when an acceptable driver input is being commanded and reject undesired inputs. The ADS 24 in conjunction with an EPS system 16 can use the methods and systems discussed herein to smooth the transitions out of angle-based steering control modes. During a steering takeover event, the ADS 24 can determine one or more blended vehicle steering commands and blended vehicle paths and control the vehicle steering to move the vehicle 12 in the operator's intended direction before the takeover criteria have been fully met.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method of controlling a vehicle, the vehicle including a controller with an automated driving system (ADS), the method comprising:
    determining, by the controller, a first projected path with a first steering command for automated steering control of the vehicle by the ADS of the controller;
    receiving, by the controller, sensor data from a vehicle sensor, wherein the sensor data corresponds to a steering input by an operator of the vehicle;
    determining, by the controller, a first blended vehicle path resulting from a first blended steering command based on the first projected path and the first steering command for automated steering control and the sensor data corresponding to the steering input;
    receiving geolocation data indicative of a real-time location of the vehicle;
    determining, from the received geolocation data, an instantaneous lane position of the vehicle using the automated driving system of the controller;

comparing, by the controller, the first projected path with the instantaneous lane position of the vehicle;
determining, by the controller, if the first blended vehicle path satisfies a first criteria;
responsive to the controller determining that the first blended vehicle path satisfies the first criteria, relinquishing control, by the controller, of the vehicle from the automated driving system to the operator; and
responsive to the controller determining that the first blended vehicle path does not satisfy the first criteria, generating, by the controller, a second blended vehicle path resulting from a second blended steering command based on the first projected path and the sensor data corresponding to the steering input.

2. The method of claim 1, wherein relinquishing control of the vehicle from the ADS to the operator includes gradually incorporating the steering input by iteratively generating blended steering commands and blended vehicle paths that incorporate some or all of the steering input.

3. The method of claim 1, wherein the first blended vehicle path satisfies the first criteria when the steering input is within a predetermined lateral steering deviation from the first projected path.

4. The method of claim 3, further comprising selectively rejecting, by the controller, the steering input responsive to the first blended vehicle path not satisfying the first criteria.

5. The method of claim 3, further comprising:
selectively accepting, by the controller, an acceptable portion of the sensor data corresponding to the steering input that satisfies the first criteria;
selectively rejecting, by the controller, an unacceptable portion of the sensor data corresponding to the steering input that does not satisfies the first criteria; and
generating a new blended steering path with a new blended steering command based on the first projected path, the first steering command, and the acceptable portion of the sensor data corresponding to the steering input that satisfies the first criteria.

6. The method of claim 1, further comprising determining, by the controller, a confidence interval defining an engagement level of the operator, wherein the engagement level of the operator is determined by comparing an operator-input steering wheel angle with an automated driving system steering wheel angle.

7. The method of claim 6, further comprising relinquishing control, by the controller, of the vehicle from the automated driving system to the operator when the confidence interval reaches a predetermined threshold.

8. The method of claim 6, wherein the vehicle sensor includes a torque sensor configured to determine an operator-input steering torque and a steering wheel angle sensor configured to determine a steering wheel angle, and wherein the steering input includes the operator-input steering torque and the steering wheel angle.

9. The method of claim 8, wherein determining the confidence interval comprises comparing, by the controller, the steering wheel angle with the first projected path of the vehicle.

10. The method of claim 1, wherein relinquishing control includes gradually relinquishing, by the controller, steering control of the vehicle to the operator during a predetermined time interval.

11. An automotive vehicle, comprising:
a body;
a steering system coupled to the body and including a sensor;
an actuator operably coupled to the steering system, the actuator being configured to automatically control the steering system; and
a controller in communication with the sensor and the actuator, the controller having an automated driving system (ADS) and being configured to:
determine a first projected path with a first steering command for automated steering control of the automotive vehicle by the ADS of the controller;
receive sensor data corresponding to a steering input by an operator of the automotive vehicle;
determine a second projected path of the automotive vehicle based on a blend of the sensor data corresponding to the steering input by the operator, the first steering command, and the first projected path;
determine, from received geolocation data, an instantaneous lane position of the automotive vehicle;
compare the first projected path with the second projected path and with the instantaneous lane position;
determine when the second projected path satisfies a first criteria;
responsive to the controller determining that the second projected path satisfies the first criteria, relinquish control of the automotive vehicle from the automated driving system to the operator; and
responsive to the controller determining that the second projected path does not satisfy the first criteria, reject the steering input and automatically control the automotive vehicle to follow the first projected path.

12. The automotive vehicle of claim 11, wherein relinquishing control of the vehicle from the ADS to the operator includes gradually incorporating the steering input by iteratively generating blended steering commands and blended vehicle paths that incorporate some or all of the steering input.

13. The automotive vehicle of claim 11, wherein the second projected path satisfies the first criteria when the steering input is within a predetermined lateral steering deviation from the first projected path.

14. The automotive vehicle of claim 11, wherein the controller is further configured to selectively reject steering input that does not satisfy the first criteria and selectively accept an acceptable portion of the sensor data corresponding to the steering input that satisfies the first criteria.

15. The automotive vehicle of claim 11, wherein the controller is further configured to gradually relinquish steering control of the vehicle to the operator during a predetermined time interval.

16. The automotive vehicle of claim 11, wherein the sensor includes a torque sensor configured to determine an operator-input steering wheel torque and a steering wheel angle sensor configured to determine a steering wheel angle.

17. A system for controlling an automotive vehicle, comprising:
a steering system including a sensor;
an actuator operably coupled to the steering system, the actuator being configured to automatically control the steering system; and
a controller in communication with the sensor and the actuator, the controller having an automated driving system (ADS) and being configured to:
determine a first projected path with a first steering command for automated steering control of the automotive vehicle by the ADS of the controller;
receive sensor data corresponding to a steering input by an operator of the automotive vehicle;

determine a first blended vehicle path comprising a first blended steering command based on the first projected path, the first steering command, and the sensor data corresponding to the steering input;

receive geolocation data indicative of a real-time location of the vehicle;

determine, from the received geolocation data, a current lane position of the vehicle;

compare the first projected path with the current lane position of the automotive vehicle as determined by the automated driving system;

determine when the first blended vehicle path satisfies a first criteria;

responsive to the controller determining that the first blended vehicle path satisfies the first criteria, relinquish control of the vehicle from the automated driving system to an operator; and responsive to the controller determining that the first blended vehicle path does not satisfy the first criteria, generate a second blended vehicle path resulting from a second blended steering command based on the first projected path and the sensor data corresponding to the steering input.

18. The system of claim 17, wherein the steering input is an operator-inputted steering command and the first criteria is satisfied when the steering input is within a predetermined lateral steering deviation from the first projected path.

19. The system of claim 17, wherein the controller is further configured to determine a confidence interval defining an engagement level of the operator, wherein the confidence interval comprises comparing a steering wheel angle measured by the sensor with a steering angle associated with the first projected path of the vehicle.

20. The system of claim 17, wherein the controller is further configured to selectively reject the steering input that does not satisfy the first criteria, selectively accept an acceptable portion of the sensor data corresponding to the steering input that satisfies the first criteria, and gradually relinquish steering control of the vehicle to the operator during a predetermined time interval.

* * * * *